(12) United States Patent
Benad et al.

(10) Patent No.: US 7,844,486 B2
(45) Date of Patent: Nov. 30, 2010

(54) SYSTEM AND METHOD FOR DETERMINING AND INCREASING AN ACCURACY OF COSTING

(75) Inventors: John Benad, Werder (DE); Thoralf Nehls, Jesteburg (DE); Martin Nehls, Hamburg (DE)

(73) Assignee: Faction GmbH, Potsdam (DE)

( * ) Notice: Subject to any disclaimer, the term of this patent is extended or adjusted under 35 U.S.C. 154(b) by 393 days.

(21) Appl. No.: 11/979,548

(22) Filed: Nov. 5, 2007

(65) Prior Publication Data

US 2009/0119137 A1 May 7, 2009

(51) Int. Cl.
*G06F 17/00* (2006.01)
(52) U.S. Cl. .................................................. 705/10
(58) Field of Classification Search ................ 705/10
See application file for complete search history.

(56) References Cited

U.S. PATENT DOCUMENTS

| | | | | |
|---|---|---|---|---|
| 5,249,120 A | * | 9/1993 | Foley | 705/1 |
| 5,799,286 A | * | 8/1998 | Morgan et al. | 705/30 |
| 5,960,417 A | * | 9/1999 | Pan et al. | 705/400 |
| 5,966,694 A | * | 10/1999 | Rothschild et al. | 705/7 |
| 5,970,476 A | * | 10/1999 | Fahey | 705/28 |
| 6,751,622 B1 | | 6/2004 | Puri et al. | |

OTHER PUBLICATIONS

European (No. 08019361) Search Report dated Mar. 12, 2009.

* cited by examiner

*Primary Examiner*—Thomas Dixon
(74) *Attorney, Agent, or Firm*—Reed Smith LLP; Marc S. Kaufman (57) ABSTRACT

A method, system, and computer program product for determining and increasing the accuracy of costing including determining possible components of a product; allocating each component at least one costing wherein the costing depends on the current product definition process which may vary over time and wherein different methods for the costing may be applied; assigning an accuracy value for each costing method that is applied; for each component, multiplying its assigned accuracy value with the component's proportion to the total cost of the product, and summing up the weighted accuracies of the costings of the components resulting in an overall accuracy of the costing of the product.

27 Claims, 6 Drawing Sheets

SYSTEM AND METHOD FOR DETERMINING AND INCREASING AN ACCURACY OF COSTING

BACKGROUND OF THE INVENTION

1. Field of the Invention

The invention generally relates to the field of enterprise resource planning, particularly to the assessment of cost of manufactured goods, and, more specifically, to a technique of increasing the accuracy of costing manufactured goods.

2. Description of the Related Art

Enterprise resource planning systems are used for unified integration of all data and processes of an organization. Typically, an enterprise resource planning system uses multiple components of computer software and hardware to achieve the integration. One important software module is a unified database to store data for the various system modules. Depending on the size of the system, data modules and system modules may be both physically and logically distributed. Physical distribution means that the components are spread over different hardware (e.g. servers) whereas logical distribution describes a functional separation of the modules which may be implemented on the same hardware platform.

Enterprise resource planning systems have conventionally been implemented primarily in the manufacturing environment, but today they are used in a much broader scope, i.e. covering all basic functions of an organization, regardless of the organization's business character. Generally, the benefit of an enterprise resource planning system is to replace two or more independent applications, eliminating the need for external interfaces previously required between systems. Additional benefits range from standardization and lower maintenance of fewer systems (e.g., one system instead of two or more systems) to allowing easier and/or greater reporting capabilities (since, for example, all data is typically kept in one database with only one well defined interface).

The term "costing" describes the process of identifying the costs of the business and of breaking them down and relating them to the various activities of the organization. In order to determine the factory costs for a given product, typically cost estimates are developed at all stages of a product development and product production cycle based on a plurality of scenarios, for example, describing potential future variations of schedule, production site, technology, suppliers, subcontractors, tariffs, prices etc. In other words, costing is a process which requires analysis, simulation, and optimization of future production costs.

The analysis process covers identifying all raw materials, preliminary products and production passes necessary to manufacture the final finished product. In the simulation process, the influence of technical alternatives, increasing product and project complexity and innovation management is examined, including the evaluation of economic alternatives such as the trade-off between make or buy, the production site selection, the supplier selection and the target date for the start of the production. Finally, in the optimization process the processing of data obtained in the simulation phase is structured in a beneficial manner, usually to minimize the overall cost.

Though calculation of these processes could be performed by computer programs (such as spreadsheet calculators) or, even in a person's memory (e.g., in cases of low complexity), it is evident that in order to increase the calculation quality, the costing of complex products requires structuring, standardization, versioning, automated quality testing, audit proof archiving and incorporation of different calculations.

Furthermore, the costing process is subject to market trends such as cost pressure and risk dislocation requiring a design to cost or target cost calculation or defined usage of standardized parts. Thus, if a high proliferation of options is important, costing includes variant management for simulation of technical alternatives such as product structures, production and processes. If, however, an increased outsourcing is desired, variant management for simulating economical alternatives with respect to the selection of suppliers and determination of the right place and time is required.

Global determination of cost process analysis may include budgeted product and project controlling costs and specific investment management considerations. Other considerations in cost process analysis, such as increased differentiation, can require innovation management and a benchmark with function costs analysis. In summary, costing captures various trends by means of methodical expertise resulting in a combination of technical and economical perspectives by identification of the specific cost drivers, the defined usage of standardized parts and a lifetime simulation.

As a module of an enterprise resource planning system, costing is generally highly communicative with other modules or the user of the system and provides cost transparency for a flexible reporting system. For a better understanding of this concept, the following example is provided to demonstrate an application of the aforementioned concept:

A customer requests a quotation for a certain product from a supplier expecting a pricing of the quotation based on the requirements stated either in the quotation or by reference to known industry standards. The supplier starts with a decision of whether or not the product meets the given requirements. If this decision is positive, the supplier either imports an existing calculation of a bill of materials or creates a new product structure. Now the supplier initiates an internal optimization process by iteratively adapting the calculation towards the cost target. This phase includes the identification of cost reduction potential, costed evaluation of technical alternatives, suppliers and site selection. Ideally, the supplier meets the cost target and starts the production after signing the contract with the customer. One should note that depending on the type of industry, the unilateral calculation towards the cost target could also include the cost consideration of the entire value chain, integrating suppliers and customers, for example, by aiming at stronger negotiation positions when purchasing raw materials or by balancing product cost versus cost in use.

Thus, a so-called "ABC analysis" has been provided as a common practice for grouping all cost related items into three categories: namely, A for cost relevant items, B for less cost relevant items and C for items with only minor cost relevance.

While optimizing cost relevant parameters in order to meet a cost target, it may be desirable to make preliminary production related decisions. Such decisions can be related to various production scenarios. Furthermore, one set of production scenarios may be unique from other kinds of production scenarios depending upon specific situations. For example, it would be desirable to make a determination to postpone the start of production, e.g., when a drastic decrease in a purchase price for product parts is expected in the near future.

In another example, it is generally known that production costs can vary considerably among different production sites. Hence, it would be desirable to be able to calculate these differences and utilize them for the compilation of best and worst case scenarios. In another example, an accurate cost analysis is desirable for the evaluation of alternatives in production technology. In yet another example, an accurate cost analysis is desirable for selecting a choice of suppliers for purchasing parts and the availability of block pricing and rebates.

Thus, a need exists to provide a cost analysis simulation capable of automatically addressing cost relevant parameters and weighing all these parameters against each other to provide/suggest an optimal set of choices between alternatives for various situations including, for example, those outlined above.

SUMMARY OF THE INVENTION

Therefore, it is an object of the present invention to determine and to increase the accuracy of the costing of a product composed of the plurality of components.

This object is solved by a computer implemented method for determining the components of a product, allocating each component at least one costing wherein the costing depends on the current product definition process which may vary over time and wherein different methods for the costing may be applied; assigning an accuracy value for each costing method that is applied; for each component multiplying its assigned accuracy value with the component's proportion to the total cost of the product, and summing up the weighted accuracies of the costings of the components resulting in an overall accuracy of the costing of the product.

In accordance with another embodiment of the present invention, a computer readable medium having a program of instructions executable by a computer to perform a method for determining and increasing the accuracy of costing is provided that in some embodiments includes instructions for determining possible components of a product and instructions for allocating each component at least one costing wherein the costing depends on the current product definition process which may vary over time and wherein different methods for the costing may be applied. The computer readable medium may further include instructions for assigning an accuracy value for each costing method that is applied and for each component, multiplying its assigned accuracy value with the component's proportion to the total cost of the product. Instructions for summing up the weighted accuracies of the costings of the components may also be provided which can result in an overall accuracy of the costing of the product.

In accordance with yet another embodiment of the present invention, a system for determining and increasing the accuracy of costing is provided that in some embodiments includes a means for determining possible components of a product and a means for allocating each component at least one costing wherein the costing depends on the current product definition process which may vary over time and wherein different methods for the costing may be applied. The system may also include a means for assigning an accuracy value for each costing method that is applied and for each component, multiplying its assigned accuracy value with the component's proportion to the total cost of the product. A means for summing up the weighted accuracies of the costings of the components resulting in an overall accuracy of the costing of the product may also be provided by the system.

These and other objects and novel features of the invention will be more fully apparent when the description of the following preferred embodiments are read in conjunction with the accompanying drawings and claims. It is to be noted that the drawings are only illustrative and are not intended to limit the scope of this invention.

DETAILED DESCRIPTION OF THE INVENTION

Reference will now be made in detail to the preferred embodiments of the present invention, examples of which are illustrated in the attached drawings, wherein like reference numerals refer to like elements throughout.

Costing is a recurring part of enterprise resource planning which is an attempt to integrate all data and processes of an organization into a unified system. Typically it consists of multiple components of computer software and hardware to achieve the integration. In an industrial environment the cost for a finished product is usually determined by the sum of the raw materials needed for manufacturing this particular product plus a number of additional dependent cost factors such human resources and tools needed for the manufacturing process. Naturally, an enterprise seeks for close to optimal operation conditions, namely full load of the machinery, modest workload of their employees and only small amount of clipping of the raw materials.

Typically, process optimization is archived by an iterative update of table-like data. In one current application, this may include utilizing the aid of a spreadsheet calculation such as Microsoft EXCEL. Spreadsheet calculation programs allow the implementation of dependencies by means of programming—either graphical user interface based, or command driven—as long as the items of interest can be represented by numbers, or a limited vocabulary and simple conditional dependencies known from basic programming language, such as "IF-THEN-ELSE" statements.

Improvements provided by the method disclosed by this application assist a user controlling the product definition process by assigning and evaluating accuracy to the costing process. The term "accuracy", as used in the following, describes the risk of the total costing after evaluation of the individual accuracy of each method. It is typically expressed in percent, thus ranging from 0 (uncertain) to 1.0 (definite). It should be noted that the actual value depends on the type of the product.

Technically, the context of accuracy and costing can be expressed as follows:

Assuming a product P consists of N components Q1 ... N

Further assuming that c(P) denotes the cost of product P and likewise ci(Qi) denotes the cost of the component Qi (i=1 ... N). Then the cost of the product is the sum of the components Qi:

$$c(P) = \sum_{i=1}^{N} c(Q_i)$$

Introducing accuracies, a(P) denotes the accuracy of the costing of product P and likewise a(Qi) denotes the accuracy of the costing for component Qi. Numerically an accuracy ranges between 0.0 and 1.0 which equals 0 to 100%.

Then the overall costing accuracy results in $$a(P) = \frac{\sum_{i=1}^{N}(a(Q_i) \cdot c(Q_i))}{c(P)}$$

which also can be written as:

$$a(P) = \sum \left( a(Q_i) \cdot \frac{c(Q_i)}{c(P)} \right)$$

where $$\frac{c(Q_i)}{c(P)}$$

represents the proportion of the cost of component $Q_i$ to the total cost of a product.

Accordingly, each product is comprised of one or more components. Each component has an associated cost including, for example, a raw material cost or manufacturing cost. This implies different methods for calculating product costs based on a different accuracy of each cost estimate of that product's components. Thus, depending on the type of component, different calculation methods or modes for determining a costing are provided by disclosed aspects of the present invention. Disclosed embodiments include at least seven calculation methods or modes for generating the costing applicable to grouping of components or processes. For example, the costing may be applicable to a part's list elements, materials and operations. Each mode provides/generates varying degrees of costing accuracies. In theory this accuracy can be chosen arbitrarily by the user, but practically, there are meaningful ranges for each calculation method. In a computing environment, the modes can be chosen by means of a graphical user interface, such as one executed by selecting a menu, context menu or a toolbar or by means of a programming language for complex computation formulas that go beyond a simple name/value attribution.

The different modes disclosed by the present invention, may also be regarded as methods of costing and can be described as follows:

The "standard" mode is used for new assemblies, production parts and materials. The standard mode is characterized by adding the costs of substructures.

The second mode is named "estimation" and is applicable to assemblies, production parts, purchased as well as standard parts, materials as well as feedstock and operations. It is the most imprecise mode of all disclosed embodiments and is characterized by input of the setup and productions costs.

Next, there is a "basic" mode which is applicable to operations and materials, as well as feedstock. The basic mode is an estimation mode type, and the operation allows for free fixing of estimated times and tariffs (cost rates) for workers, machines and set-up. This mode includes a calculation executed by multiplying time by tariffs or time by the cost divided by the variable batch or lot size. For example, using the basic mode for calculation of the costs for materials or feedstock, the price of the material with unit currency divided by the unit of quantity is multiplied by a pre-selected value. This value is specified either by user input or can be calculated from physical characteristics, such as, in one example, multiplying density with the volume of the material.

The third mode is called "advanced" mode and, like the basic mode, is applicable to operations and materials as well as feedstock. As with the basic mode, it also allows for free fixing of times for workers, machines and set-up. However, with this mode, the tariffs are invariable and result from the administration. In the advanced mode, the material is bound to a semi-finished product, and the calculation of the cost is performed by multiplying the price of the semi finished product with a pre-selected value. Again, the pre-selected value may be specified either by user input or can be calculated from physical characteristics, such as, for example, multiplying density with the volume of the material.

Yet another mode is the "cost center" mode which depicts workplaces. Thus, for example, the workplace may comprise two machines, one operator and another worker who adjusts the machine. This mode allows the depiction of an amount-time-calculation (e.g., production per kilogram). As with the advanced mode, this mode allows a free fixing of times or amounts, depending on the type of activity that is assigned to the cost. The tariffs are invariable and result from the administration. The calculation of cost is performed by multiplying material cost amount with the tariff and optionally dividing by the batch or lot size. The cost center mode features an interactive, dynamically generated dialogue with the user, depending on the types of activity that are assigned to the cost center. Four different outputs are preferably differentiated in this mode, namely: workers, engine, set-up and further output.

Yet, in another disclosed mode, the "scaling" mode, is also an estimation mode type. This mode is applicable to assemblies and production parts. Costs for material and production are extrapolated, wherein the extrapolation is done through cost factors. These cost factors include complexity, escalation, technology, the size or the size times the weight of the assembly. For further flexibility, additional variable factors may get added. Generally, the scaling modes allow for the multiplication of the material costs and production costs of the basic version with the cost factors and provide a rapid scalability of information about the costs possible. This mode can be beneficial such as when a cost estimate is requested for a similar product having different dimensions.

In yet another disclosed mode, the "forecast mode", is also regarded as an estimation mode type. The forecast mode is applicable to parts to be produced and is derived from a regression analysis of reference parts. This mode allows for a quick costing, since the reference parts are stored within the system and only a calculation with respect to material, feedstock or geometry is necessary.

Figure 6:
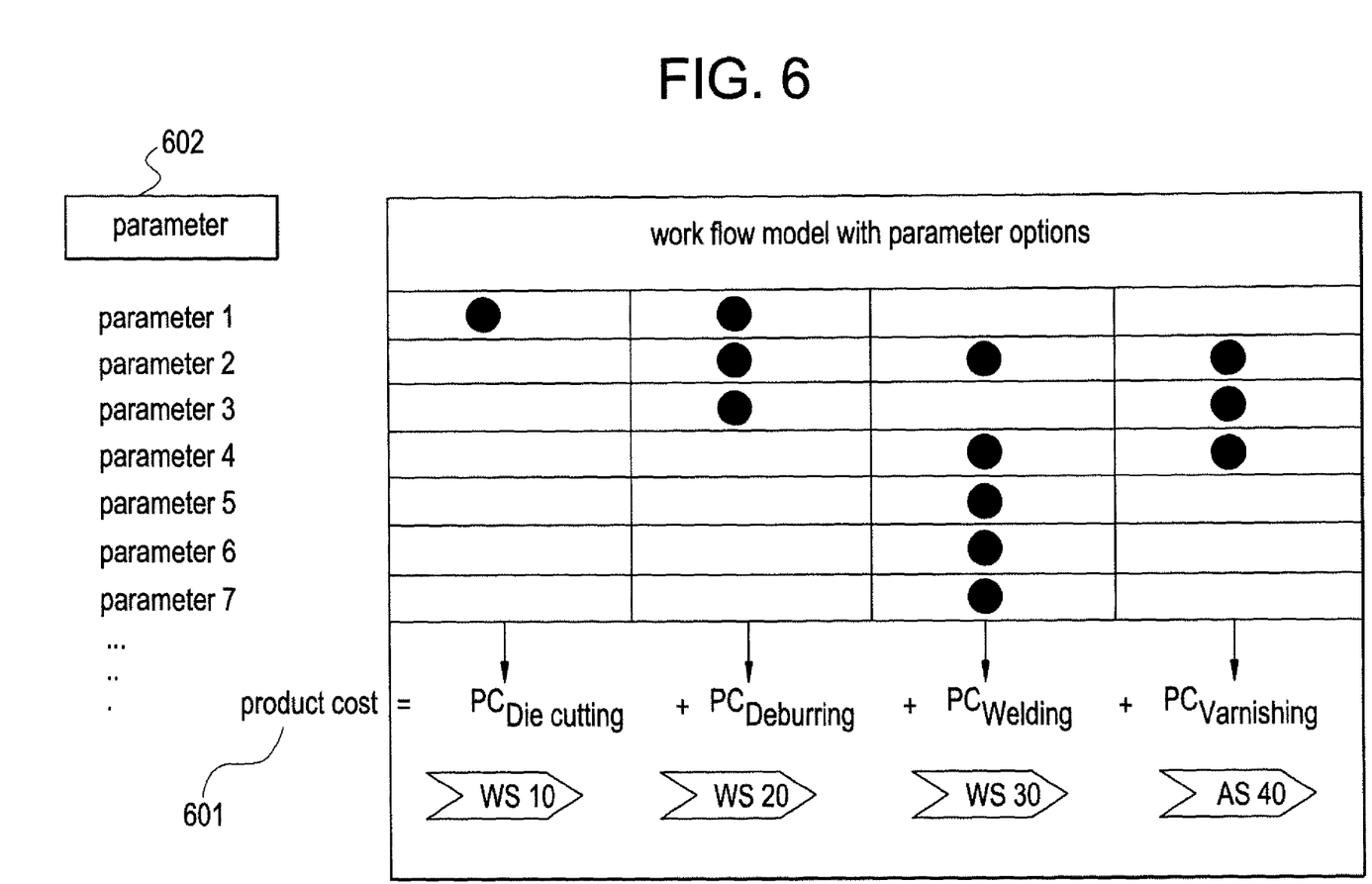
FIG. 6 is an assignment table illustrating an example of a work flow model according to an exemplary embodiment of the present invention.

The "technology" mode allows for knowledge and formula based costing. This includes a definition of costing relevant parameters and a definition of parameter dependencies in costing tables. An exemplary embodiment of this table is illustrated in FIG. 6. The parameters can be put in relation with each other by program logic and algebraic expressions and include parameter type and preferred values for the parameters.

The most precise mode, or "offer" mode, is applicable to assemblies, production parts, purchased as well as standard parts, materials and operations. In this mode, the cost of supply or set-up are entered by the user. This is the standard mode for purchased as well as standard parts, assuming that their price is not explicitly revealed as an estimation.

Figure 1:
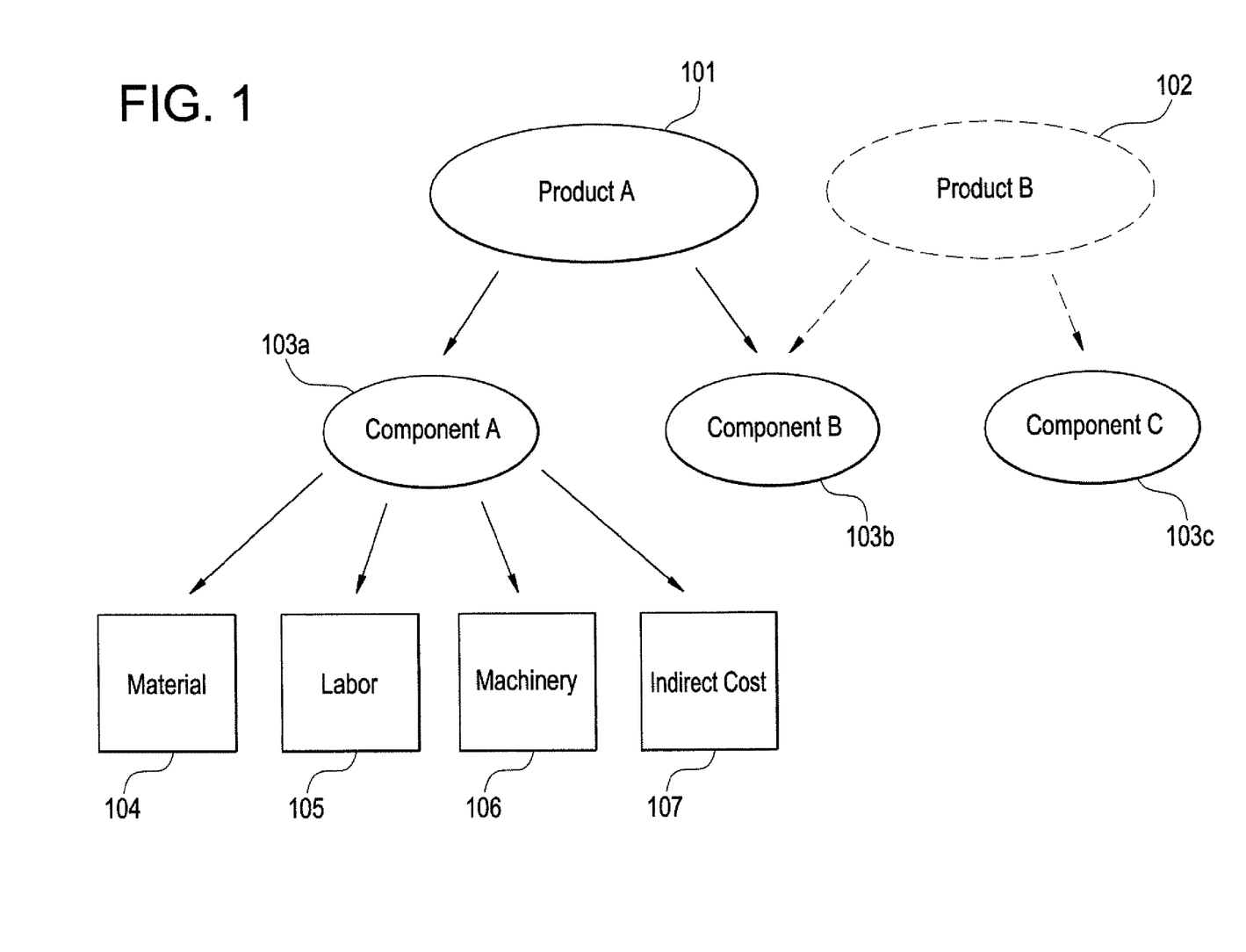
FIG. 1 illustrates a relationship between products, components and associated cost according to an exemplary embodiment of the present invention.

Having outlined the various modes for determining costing in accordance with the present invention, reference is made to FIG. 1 in which an example of a product definition process is illustrated therein. Product A 101 is shown at a given time instance of a product definition process and is made up of two components—component A 103a and component B 103b. Each of components A 103a and B 103b may include exemplary costs associated therewith. For example, component A 103a, includes associated costs for materials 104, labor 105, machinery 106 and indirect costs 107. Similar or other kinds of cost (not shown) may be associated with component B 103b.

A second product B 102 is also shown in FIG. 1 which may be either a result from a previous product definition process or a derived product. As shown, this product is comprised of a combination including the same component B 103b (as product A 101) and another component C 103c. As with components A 103a and B 103b, component C 103c may also be associated with kinds of cost (not shown).

Figure 2A:
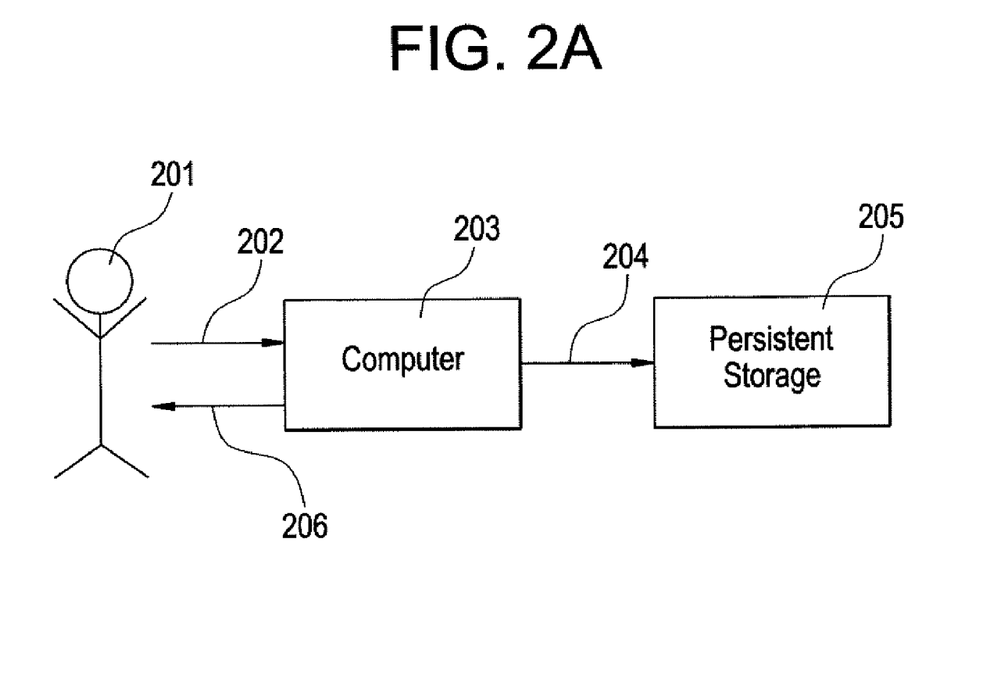
FIG. 2A illustrates an interface between a user, a computer and a persistent storage according to an exemplary embodiment of the present invention.
Figure 2B:
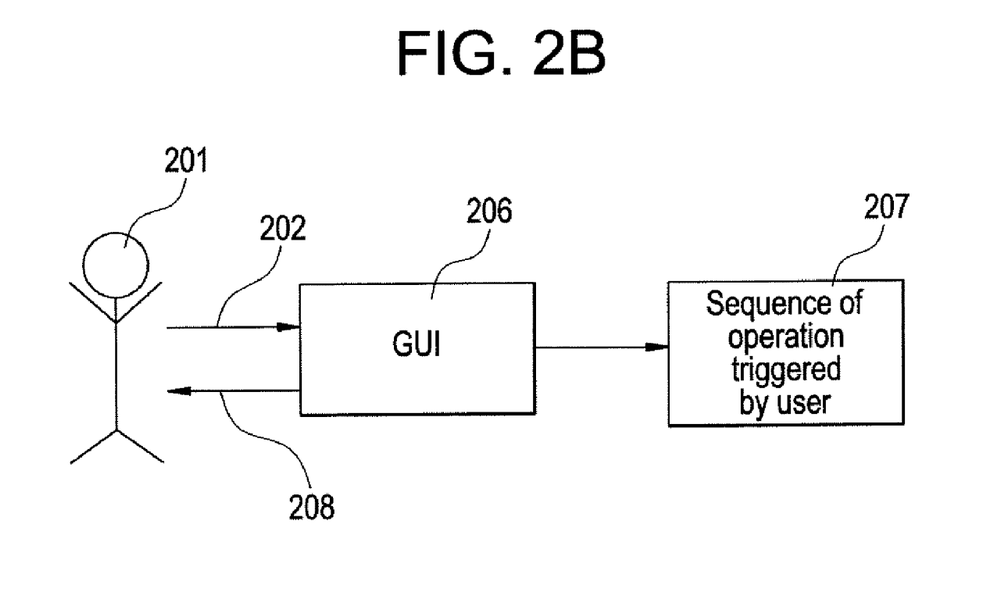
FIG. 2B illustrates an interaction between a user, a graphical user interface (GUI) and a sequence of operation triggered by a user according to an exemplary embodiment of the present invention.

Thus, depending on the type of product desired, a multiplicity of components may require cost assessment to facilitate a cost analysis. In many instances, computer assisted data processing equipment is advantageous in determining the cost analysis. FIG. 2A illustrates an example of a user 201 interacting with a computer or computer system 203 to perform a cost analysis. This embodiment may further include the use of a graphical user interface 206 (e.g., FIG. 2B) or a data import from other modules of an enterprise resource planning system to enter data 202. Computer or computer system 203 may process the entry data 202 and deliver the entry data 202 downstream to a persistent storage 205 such as via data stream direction 204. Thus a system for depositing input data 202 in order to provide standardized cost estimates is provided in an automated process. Further, the computer or computer system 203 is configured and operated to present the user 201 with accurate costing information 208. In one disclosed embodiment, the costing information 208 is provided by means of a graphical user interface 206 or data export function as depicted, for example, in FIG. 2B. Thus, the data import and data export may be implemented by means of an inter-module Application Program Interface (API) or a file or network socket based exchange of plain text or structured data, such as the Extensible Markup Language (XML).

Figure 3:
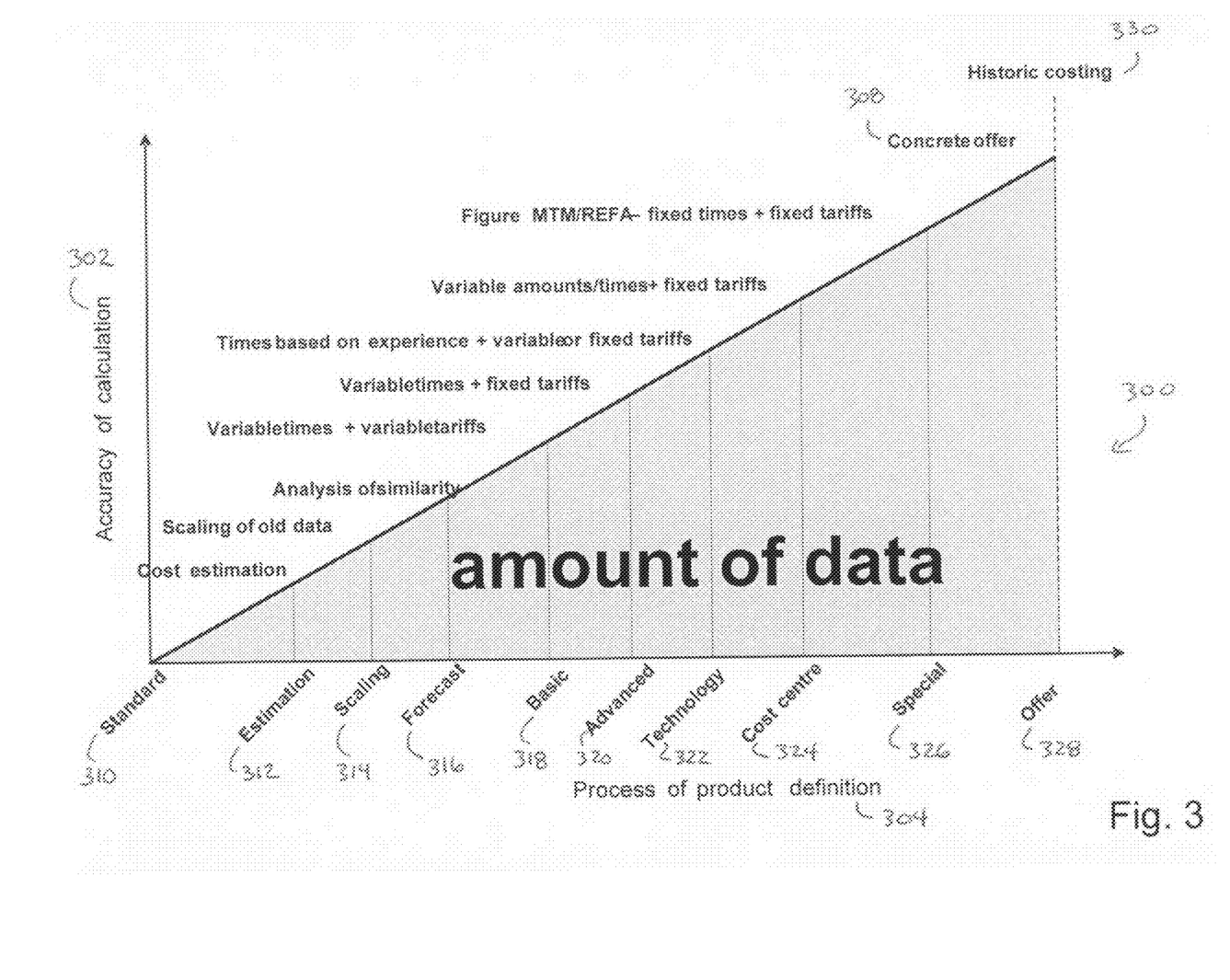
FIG. 3 is a diagram illustrating the correlation of the accuracy of a calculation over the point in time of a process of product definition according to an exemplary embodiment of the present invention.

FIG. 3 provides an illustration 300 of the correlation of the accuracy of a calculation of cost 302 over a point in time of a process of product definition 304. At each time instance of a product definition process 304, the costing may be accomplished by using different methods or modes for costing, each method or mode producing a respective costing having a respective accuracy level. Typically there is a linear increase in the overall accuracy of the costing as the product definition process advances. However, there may be rebounds such as when a change of the components for a product becomes necessary.

Thus, according to disclosed embodiments, as the product definition process advances, more data 306 is collected and available for analysis to produce a more accurate costing when a concrete offer 308 is generated. The example depicted in FIG. 3 showing the accuracy of a calculation 302 of cost over the process of a product definition 304 begins with a new product definition having no available initial costing. Therefore, there exists a high uncertainty of accuracy corresponding to an accuracy of zero. As the initial costing starts with a rough cost estimate 312, the first refinement consists of a costing, which is based on an estimated price without taking any dependencies between components into account. Additional methods or modes for costing may be employed including, for example, "scaling" 314, "forecast" 316, "basic" 318, "advanced" 320, "technology" 322, and "cost center" 324. Additionally, other specialized or "special" methods or modes 326 may be employed to facilitate generation of an offer 328 to produce a concrete offer 308.

Thus, in further steps of refinement, specific events and situational analysis may drive the costing model to produce a costing result unique to producing a particular product. For example, in one instance, the dependencies of the manufacturing process with respect to cost for usage of assembly lines and machinery may be taken into account in cost analysis. In some embodiments, as the product definition process advances, costing may take into account the technical interrelation or the product component with respect to form a material. In cases where the uncertainty of the product characteristics decreases, entrepreneurial experience may lead to a derived costing. Disclosed embodiments may further take into account similarities of products from previous product definition processes in which a costing may be based or derived from a previous product definition process. Thus, in accordance with the present invention, a product definition process ends with a concrete offer 308 to a client based on the historic costing 330 gathered from the amount of data 306. Hence, each costing may be performed on an iterative basis, allowing the user to influence the product definition in specialized manner, i.e., to increase the overall accuracy of costing.

Figure 4:
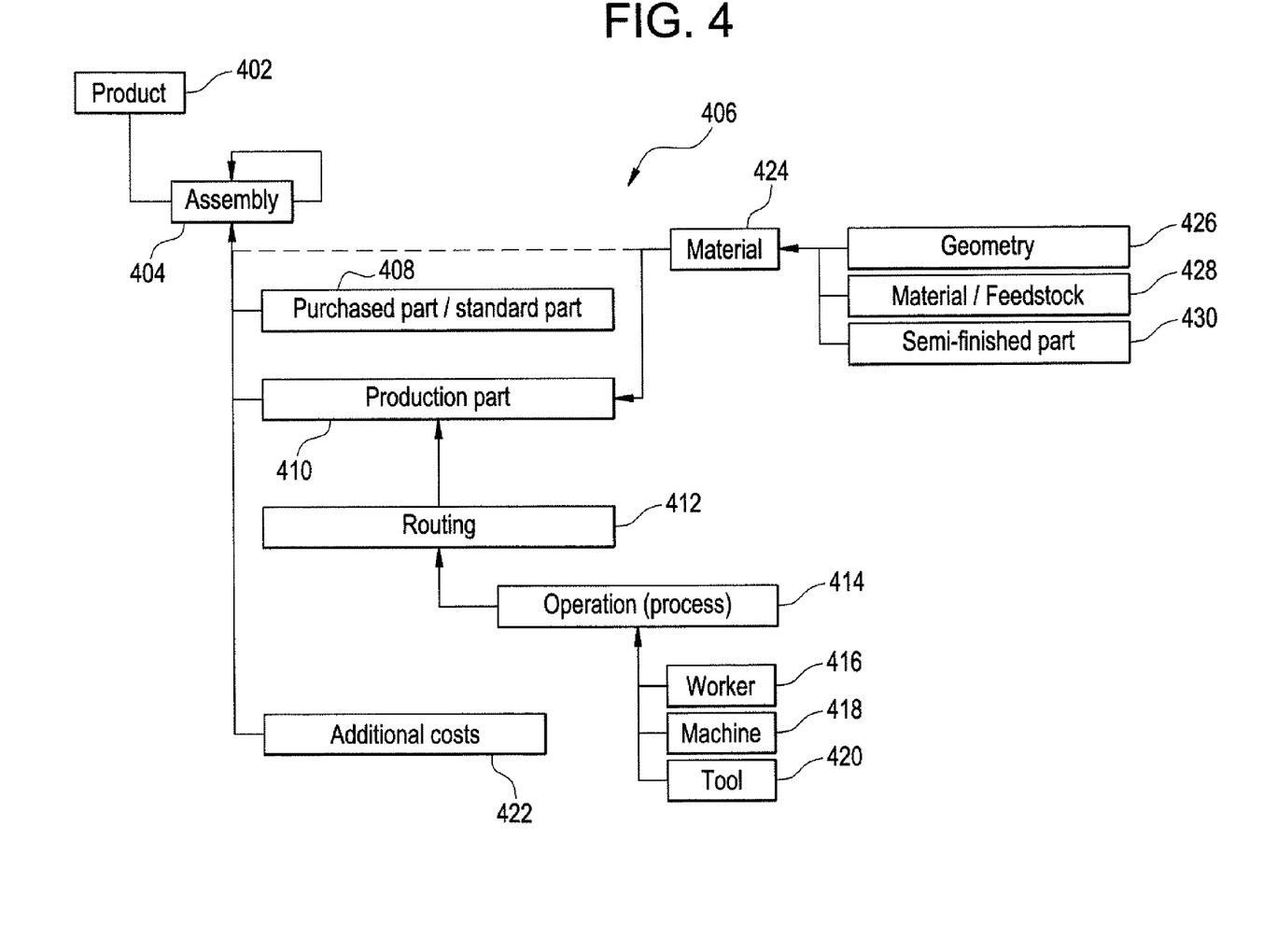
FIG. 4 illustrates the correlation of a product, assembly and associated cost in determining costing for components of a product according to an exemplary embodiment of the present invention.

FIG. 4 provides an example of a correlation of a product 402, on or more components and associated costs 406. As it can be seen from the figure, a product 402 is made up of one or more components which may be arranged or assembled in an assembly 404 to form the product 402. Each component has one or more assigned costs associated therewith. In one embodiment, these costs may include a cost for purchasing a component 408, a cost for manufacturing the product 410, a cost for routing the product 412 based on process costs 414 such as cost for workers 416, machinery 418 and tools 420. Additional associated costs may further include additional costs 422 not otherwise associated with other more standardized costs. It is further noted that in the production or manufacturing of the product 410, other considerations may be taken into account. This may include, for example, the kind of material 424 used, the size or geometry of material 426, the material supply origin or feedstock 428 and materials including semi-finished products or parts 430.

Figure 5:
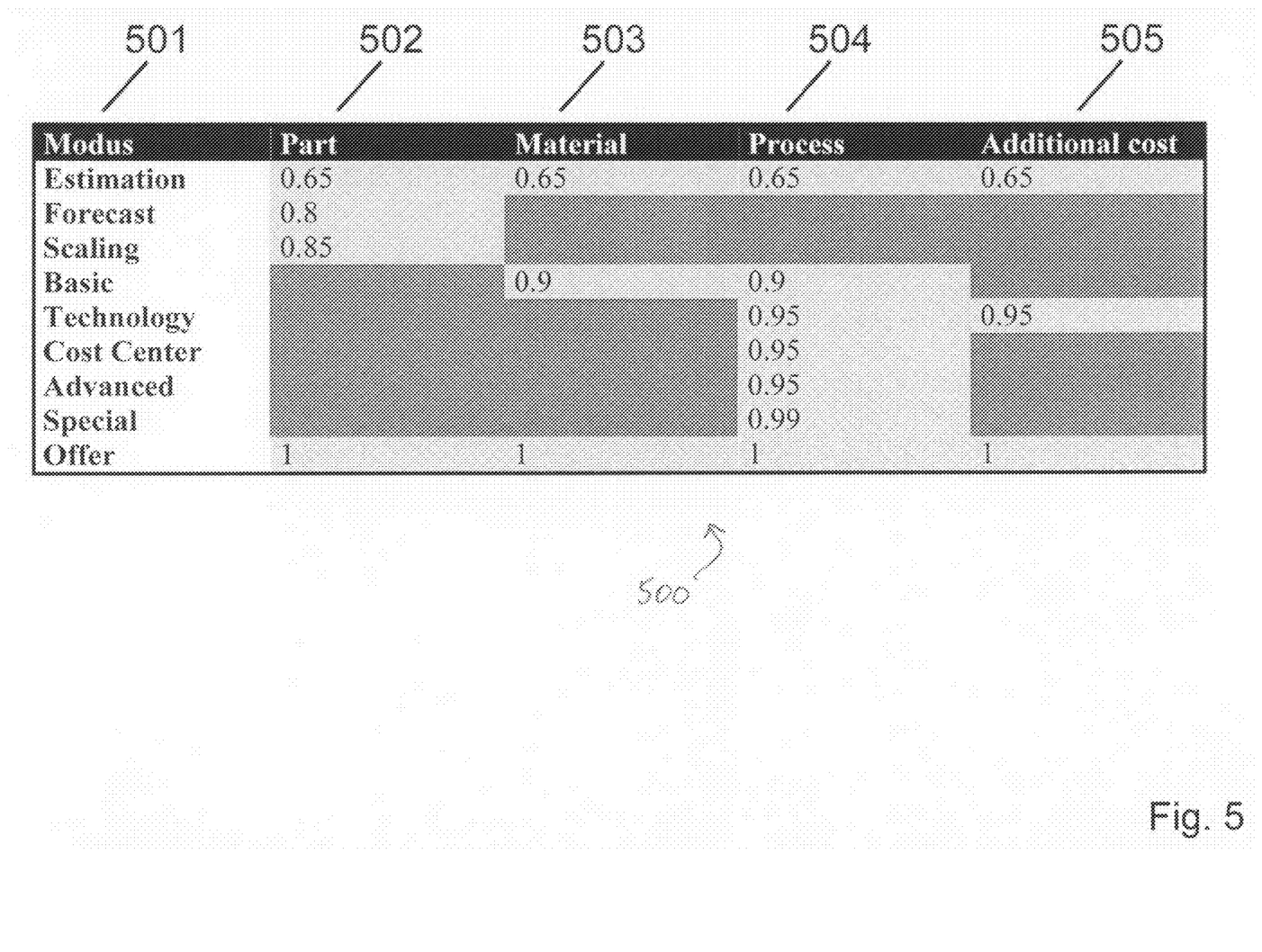
FIG. 5 is an exemplary table of cost accuracy values for different costing modes according to an exemplary embodiment of the present invention.

Turning to FIG. 5, an exemplary chart 500 illustrates cost accuracy values for different types of costing modes 501 in accordance with disclosed embodiments of the invention. The values are indicated for different cost categories including, for example, part 502, material 503, process 504 and additional costs 505. Thus, one can readily compare the accuracy for respective modes of costing for specific cost categories. For example, the "estimation" mode typically shows the lowest accuracy, whereas the "offer" mode typically shows a very accurate costing in all cost categories. Thus, the costing information provided by the present invention provides more accurate cost analysis in determining costing of products.

FIG. 6 illustrates an example of a work flow model with parameter options as used in the "technology" mode. In this example, the product cost 601 is the sum of the four manufacturing processes: die cutting, deburring, welding and varnishing. As can be seen from the parameter matrix, each manufacturing pass is influenced by one or more parameters 602. In the example, parameter 1 influences the product cost for die cutting and deburring, whereas parameter 2 influences deburring, welding and varnishing. In an alternate interpretation, the matrix may be viewed showing that the production for die cutting is only influenced by parameter 1, whereas welding cost depends on parameter 2 and 4 to 7.

In some preferred embodiments, any manufactured product will generally comprise several components, and the overall cost of the product is the sum of the costs of the individual components. Calculating manufacturing costs for each component may be more or less accurate depending at which point in time of the development cycle of the whole product this costing is performed. While in the beginning of a product developing cycle, the costs may be rather imprecise, it can be expected that as the process advances, the costing becomes more and more accurate.

In order to determine the costs for an individual component, different costing methods are available and the skilled person will select whichever methods for the costing of each component that appear most suitable for them. When different costing methods are applied, these different costing methods can be expected to have different levels of accuracy.

Moreover, it is also possible that for the calculation of the costs of a component, different costing methods are applied depending on the point in time the costing is performed for a particular component. In accordance with the principles of the present invention, a product to be manufactured is broken down into its components and costing is done separately for each component.

Certainly, it is possible that a product in the beginning of the development cycle has more or less components than the final product. Consequently, even the number of components of a product may vary over time. In accordance with the principles of the present invention, each component cost is at any time of interest calculated according to a currently suitable costing method.

Each costing method has a particular level of accuracy. In accordance with the principles of the present invention, the overall accuracy of costing of the product is calculated by summing up the accuracy values of each involved costing method and weighting each accuracy value with the proportion of the costs of the respective component to the overall products. In this manner, the final overall accuracy value is achieved, which is an indicator of the accuracy level of the currently estimated total costs.

As indicated above, it is to be expected that while the product definition advances, the number of components to be looked at becomes more accurate, the applied costing methods become more suited and exact in that the overall accuracy value should increase towards the end of the product development.

The above-described devices and subsystems of the exemplary embodiments of FIGS. 1-6 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-6. The devices and subsystems of the exemplary embodiments of FIGS. 1-6 can communicate with each other using any suitable protocol and can be implemented using one or more programmed computer systems or devices.

One or more interface mechanisms can be used with the exemplary embodiments of FIGS. 1-6, including, for example, Internet access, telecommunications in any suitable form (e.g., voice, modem, and the like), wireless communications media, and the like. For example, the employed communications networks can include one or more wireless communications networks, cellular communications networks, 3G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-6 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-6 can be implemented via one or more programmed computer systems or devices.

To implement such variations as well as other variations, a single computer system can be programmed to perform the special purpose functions of one or more of the devices and subsystems of the exemplary embodiments of FIGS. 1-6. On the other hand, two or more programmed computer systems or devices can be substituted for any one of the devices and subsystems of the exemplary embodiments of FIGS. 1-6. Accordingly, principles and advantages of distributed processing, such as redundancy, replication, and the like, also can be implemented, as desired, to increase the robustness and performance the devices and subsystems of the exemplary embodiments of FIGS. 1-6.

The devices and subsystems of the exemplary embodiments of FIGS. 1-6 can store information relating to various processes described herein. This information can be stored in one or more memories, such as a hard disk, optical disk, magneto-optical disk, RAM, and the like, of the devices and subsystems of the exemplary embodiments of FIGS. 1-6. One or more databases of the devices and subsystems of the exemplary embodiments of FIGS. 1-6 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-6 can include appropriate data structures for storing data collected and/or generated by the processes of the devices and subsystems of the exemplary embodiments of FIGS. 1-6 in one or more databases thereof.

All or a portion of the devices and subsystems of the exemplary embodiments of FIGS. 1-6 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-6 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-6, for driving the devices and subsystems of the exemplary embodiments of FIGS. 1-6, for enabling the devices and subsystems of the exemplary embodiments of FIGS. 1-6 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-6. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-6 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

Although the present invention has been described herein in considerable detail with reference to particular exemplary embodiments, certain modifications or alterations may be apparent to those skilled in the art, without departing from the scope of the invention. The exemplary embodiments are meant to be illustrative, not limiting the scope of the invention, which is defined by the following claims.

What we claim is:

1. A method for determining and increasing an accuracy of costing, comprising:
    determining possible components of a product;
    using a computing device, allocating at least one costing to each of the components of the product, wherein the at least one costing depends on a current product definition process which may vary over time, and wherein one or more different methods for the costing may be applied;
    using the computing device, assigning an accuracy value for each of the one or more different costing methods that is applied;
    using the computing device, determining a weighted accuracy of the costing for each of the components; and
    using the computing device, summing up the weighted accuracies of the costings of the components resulting in an overall accuracy of the costing of the product.

2. The method of claim 1, repeating at least one of the steps to improve the resulting overall accuracy as the product definition process advances.

3. The method of claim 1, wherein at least one of the one or more different methods for costing is based on a cost estimate.

4. The method of claim 1, wherein at least one of the one or more different methods for costing is based on an estimated price without dependencies between the components.

5. The method of claim 1, wherein at least one of the one or more different methods for costing is based on an estimated price taking into account dependencies of a manufacturing process with respect to a cost for usage of assembly lines and machinery.

6. The method of claim 1, wherein at least one of the one or more different methods for costing is based on an estimated price taking into account a technical interrelation of the product or component with respect to a form and a material.

7. The method of claim 1, wherein at least one of the one or more different methods for costing is based on an entrepreneurial experience which leads to a derived costing.

8. The method of claim 1, wherein at least one of the one or more different methods for costing is based on a derived costing from previous product definition processes.

9. The method of claim 1, wherein determining the weighted accuracy of the costing for each of the components comprises, for each of the components of the product, multiplying the accuracy value assigned to the at least one costing method used for the component by a proportion of a total cost of the product for the component to determine the weighted accuracy of the costing for each of the components.

10. A tangible computer readable medium having a program of instructions executable by a computer to perform a method for determining and increasing an accuracy of costing comprising:
    instructions for determining possible components of a product;
    instructions for allocating at least one costing to each of the components of the product, wherein the at least one costing depends on a current product definition process which may vary over time, and wherein one or more different methods for the costing may be applied;
    instructions for assigning an accuracy value for each of the one or more different costing methods that is applied;
    instructions for determining a weighted accuracy of the costing for each of the components; and
    instructions for summing up the weighted accuracies of the costings of the components resulting in an overall accuracy of the costing of the product.

11. The tangible computer readable medium of claim 10, wherein the instructions allow for repeating at least one of the steps to improve the resulting overall accuracy as the product definition process advances.

12. The tangible computer readable medium of claim 10, wherein at least one of the one or more different methods for costing are based on a cost estimate.

13. The tangible computer readable medium of claim 10, wherein at least one of the one or more different methods for costing are based on an estimated price without dependencies between the components.

14. The tangible computer readable medium of claim 10, wherein at least one of the one or more different methods for costing are based on an estimated price taking into account dependencies of a manufacturing process with respect to a cost for usage of assembly lines and machinery.

15. The tangible computer readable medium of claim 10, wherein at least one of the one or more different methods for costing are based on an estimated price taking into account a technical interrelation of the product or component with respect to a form and a material.

16. The tangible computer readable medium of claim 10, wherein at least one of the one or more different methods for costing are based on entrepreneurial experience which leads to a derived costing.

17. The tangible computer readable medium of claim 10, wherein at least one of the one or more different methods for costing are based on a derived costing from previous product definition processes.

18. The tangible computer readable medium of claim 10, wherein the instructions for determining the weighted accuracy of the costing for each of the components comprise instructions for multiplying the accuracy value assigned to the at least one costing method used for each of the components of the product by a proportion of a total cost of the product for each of the components to determine the weighted accuracy of the costing for each of the components.

19. A system for determining and increasing an accuracy of costing, comprising:
   a graphical user interface; and
   a computing device coupled to the graphical user interface, wherein the computing device is configured to:
      enable a user to determine possible components of a product via the graphical user interface;
      allocate at least one costing to each of the components of the product, wherein the at least one costing depends on a current product definition process which may vary over time, and wherein one or more different methods for the costing may be applied;
      assign an accuracy value for each of the one or more different costing methods that is applied;
      determine a weighted accuracy of the costing for each of the components; and
      sum up the weighted accuracies of the costings of the components resulting in an overall accuracy of the costing of the product displayable on the graphical user interface.

20. The system of claim 19, wherein the computing device is further configured to repeat at least one of the steps of its configuration to improve the resulting overall accuracy as the product definition process advances.

21. The system of claim 19, wherein at least one of the one or more different methods for costing is based on a cost estimate.

22. The system of claim 19, wherein at least one of the one or more different methods for costing is based on an estimated price without dependencies between the components.

23. The system of claim 19, wherein at least one of the one or more different methods for costing is based on an estimated price taking into account dependencies of a manufacturing process with respect to a cost for usage of assembly lines and machinery.

24. The system of claim 19, wherein at least one of the one or more different methods for costing is based on an estimated price taking into account a technical interrelation of the product or component with respect to a form and a material.

25. The system of claim 19, wherein at least one of the one or more different methods for costing is based on an entrepreneurial experience which leads to a derived costing.

26. The system of claim 19, wherein at least one of the one or more different methods for costing is based on a derived costing from previous product definition processes.

27. The system of claim 19, wherein the computing device configuration to determine the weighted accuracy of the costing for each of the components comprises a configuration to multiply, for each of the components of the product, the accuracy value assigned to the at least one costing method used for the component by a proportion of a total cost of the product for the component to determine the weighted accuracy of the costing for each of the components.

* * * * *

UNITED STATES PATENT AND TRADEMARK OFFICE
CERTIFICATE OF CORRECTION

| | | Page 1 of 1 |
|---|---|---|
| PATENT NO. | : 7,844,486 B2 | |
| APPLICATION NO. | : 11/979548 | |
| DATED | : November 30, 2010 | |
| INVENTOR(S) | : John Benad et al. | |

It is certified that error appears in the above-identified patent and that said Letters Patent is hereby corrected as shown below:

Title Page item 73

Please replace Assignee "Faction GmbH" with --FACTON GmbH--.

Signed and Sealed this
Twenty-sixth Day of April, 2011

David J. Kappos
*Director of the United States Patent and Trademark Office*